(12) United States Patent
Puls et al.

(10) Patent No.: US 12,352,324 B2
(45) Date of Patent: Jul. 8, 2025

(54) CLUTCH MECHANISM

(71) Applicant: Milwaukee Electric Tool Corporation, Brookfield, WI (US)

(72) Inventors: Kevin S. Puls, Milwaukee, WI (US); Beth E. Cholst, Wauwatosa, WI (US); Casey D. Garces, Brookfield, WI (US); Tyler J. Reaker, Milwaukee, WI (US); Brian J. Yue, Milwaukee, WI (US); Kang Lin Chen, Dongguan (CN); Jie Wang, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/196,839

(22) Filed: May 12, 2023

(65) Prior Publication Data

US 2023/0375049 A1    Nov. 23, 2023

(30) Foreign Application Priority Data

May 18, 2022  (CN) .......................... 202210563102.9

(51) Int. Cl.
  *F16D 43/14*   (2006.01)
  *A01D 34/68*   (2006.01)
  *F16D 41/069*  (2006.01)

(52) U.S. Cl.
  CPC ......... *F16D 43/14* (2013.01); *A01D 34/6812* (2013.01); *F16D 41/069* (2013.01); *F16D 2043/145* (2013.01)

(58) Field of Classification Search
  CPC .... F16D 43/14; F16D 2043/145; F16D 43/16; F16D 41/069; A01D 34/6812;
  (Continued)

(56) References Cited

U.S. PATENT DOCUMENTS 2,323,353 A   7/1943   Plog
2,669,619 A   2/1954   Mittelsten
(Continued)

FOREIGN PATENT DOCUMENTS

CN   201190743 Y   2/2009
CN   102444678 A   5/2012
(Continued)

OTHER PUBLICATIONS

European Search Report Corresponding with Application No. EP23172771 on Aug. 18, 2023 (1 page).

*Primary Examiner* — Farhana Pervin
(74) *Attorney, Agent, or Firm* — Dority & Manning, P.A.

(57) ABSTRACT

A clutch can include an input; an output; a centrifugal clutch mechanism that transfers energy from the input to the output, the centrifugal clutch mechanism including: a disk; centrifugal weights movably coupled to the disk; and a central shaft rotatable relative to the disk and extending through the disk, the central shaft comprising drive surfaces, wherein the disk is rotatably coupled to the input, wherein the output is rotatably coupled to the central shaft, wherein the centrifugal weights rotate between a disengaged position in which the centrifugal weights do not interface with drive surfaces and an engaged position in which the centrifugal weights interface with the drive surfaces, and wherein the centrifugal weights are disposed inside the perimeter of the disk when the centrifugal weights are in the engaged position.

19 Claims, 6 Drawing Sheets

(58) Field of Classification Search
CPC .. F16H 2003/0938; F16H 3/005; F16H 55/17; F16H 2055/178
See application file for complete search history.

(56) References Cited

U.S. PATENT DOCUMENTS

| | | | |
|---|---|---|---|
| 3,160,252 | A | 12/1964 | Gustav |
| 3,228,498 | A | 1/1966 | Zahradnik |
| 3,253,391 | A | 5/1966 | Meldahl |
| 3,833,101 | A | 9/1974 | Pozella |
| 4,046,240 | A | 9/1977 | Schlagmuller |
| 4,458,795 | A | 7/1984 | Norton |
| 4,909,365 | A | 3/1990 | Tillotson et al. |
| 6,655,515 | B2 | 12/2003 | Cox et al. |
| 6,918,480 | B2 | 7/2005 | Chevalier |
| 7,073,648 | B2 | 7/2006 | Ishikawa et al. |
| 7,665,589 | B2 | 2/2010 | Blanchard |
| 7,669,702 | B2 | 3/2010 | Blanchard |
| 7,777,444 | B2 | 8/2010 | Kawakami |
| 9,759,300 | B2 | 9/2017 | Barendrecht |
| 10,039,229 | B2 | 8/2018 | Wadinski et al. |
| 10,130,031 | B2 | 11/2018 | Yoshimura et al. |
| 10,271,476 | B2 | 4/2019 | Yoshimura et al. |
| 10,550,899 | B2 | 2/2020 | Vaughn et al. |
| 10,690,230 | B2 | 6/2020 | Teillet |
| 10,774,879 | B2 | 9/2020 | Colbert, Jr. et al. |
| 10,856,467 | B2 | 12/2020 | Maggard |
| 2002/0178708 | A1 | 12/2002 | Williams et al. |
| 2002/0185353 | A1 | 12/2002 | Ballew et al. |
| 2003/0089570 | A1 | 5/2003 | Ochab et al. |
| 2008/0121489 | A1 | 5/2008 | Chevalier |
| 2009/0250306 | A1* | 10/2009 | Harada .................. F16D 43/18 192/103 A |
| 2009/0266042 | A1 | 10/2009 | Mooney et al. |
| 2012/0000132 | A1 | 1/2012 | Scocco |
| 2012/0129637 | A1 | 5/2012 | Blanchard |
| 2013/0334005 | A1* | 12/2013 | Wu .......................... F16D 43/14 192/103 B |
| 2015/0245559 | A1 | 9/2015 | Yang et al. |
| 2017/0268584 | A1 | 9/2017 | Heath et al. |
| 2018/0195560 | A1 | 7/2018 | Chino |
| 2018/0242526 | A1 | 8/2018 | Zhang |
| 2018/0363756 | A1 | 12/2018 | Teillet |
| 2019/0223378 | A1 | 7/2019 | Fan |
| 2019/0234470 | A1* | 8/2019 | Yokomichi ............. F16D 43/18 |
| 2020/0253114 | A1 | 8/2020 | Yan |
| 2020/0340539 | A1 | 10/2020 | Matsumoto |
| 2020/0370607 | A1* | 11/2020 | Aono ...................... F16D 43/18 |
| 2021/0329832 | A1 | 11/2021 | Yamaoka et al. |
| 2023/0217860 | A1* | 7/2023 | Chen ....................... F16D 23/12 56/14.7 |

FOREIGN PATENT DOCUMENTS

| | | |
|---|---|---|
| CN | 102678895 B | 4/2015 |
| CN | 205727115 U | 11/2015 |
| CN | 105830645 A | 8/2016 |
| CN | 105940869 A | 9/2016 |
| CN | 105960948 A | 9/2016 |
| CN | 205694373 U | 11/2016 |
| CN | 205694374 U | 11/2016 |
| CN | 207340527 U | 5/2018 |
| CN | 207505457 U | 6/2018 |
| CN | 207573927 U | 7/2018 |
| CN | 109743954 B | 5/2019 |
| CN | 109743969 A | 5/2019 |
| CN | 112166798 A | 1/2021 |
| CN | 112690099 A | 4/2021 |
| CN | 213784250 U | 7/2021 |
| CN | 214430196 U | 10/2021 |
| DE | 883392 C | 7/1953 |
| DE | 1272071 B | 7/1968 |
| DE | 7520466 U | 9/1978 |
| DE | 2460487 B | 3/1980 |
| DE | 19837049 A1 | 2/2000 |
| EP | 0195172 A1 | 9/1986 |
| EP | 1198981 A2 | 4/2002 |
| EP | 3854194 A1 | 7/2021 |
| FR | 2806143 A1 | 9/2001 |
| FR | 2889276 A1 | 2/2007 |
| GB | 1240831 A | 7/1971 |
| JP | 2002340052 A | 11/2002 |
| WO | WO2012079196 A1 | 6/2012 |
| WO | WO2018040054 A1 | 3/2018 |
| WO | WO2018113738 A1 | 6/2018 |

* cited by examiner

CLUTCH MECHANISM

CROSS-REFERENCE TO RELATED APPLICATIONS

The present application claims priority to CN Patent Application No. 202210563102.9 filed on May 18, 2022, the disclosure of which is incorporated by reference herein in its entirety.

FIELD

The present disclosure relates generally to centrifugal clutch mechanisms and transmissions with centrifugal clutch mechanisms.

BACKGROUND

Typically, prime movers such as motors and engines are connected to output shafts of machines through one or more meshing interfaces which selectively transmit power from the prime mover to the output shaft. These meshing interfaces allow the prime mover to selectively propel the machine. For example, meshing interfaces between one or more driving motors and one or more wheels of a lawnmower may allow an operator to selectively drive the wheels of the lawnmower. Similarly, meshing interfaces between one or more driving motors and one or more cutting blades of the lawnmower may allow the operator to selectively drive the cutting blades.

Meshing interfaces typically utilize a user engageable element which allows a user to directly or indirectly affect the interface. For instance, a clutch fork or other user engageable element may allow the operator to selectively engage and disengage the clutch mechanism. These types of interfaces allow the operator to engage the meshing interface. However, these interfaces require user input to operate.

Accordingly, improved clutch mechanisms are desired in the art. In particular, clutch mechanisms which provide simple, cost effective, space-efficient operation would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a transmission is provided. The transmission includes an input; an output; a centrifugal clutch mechanism that transfers energy from the input to the output, the centrifugal clutch mechanism comprising: a disk; centrifugal weights movably coupled to the disk; and a central shaft rotatable relative to the disk and extending through the disk, the central shaft comprising drive surfaces, wherein the disk is rotatably coupled to the input, wherein the output is rotatably coupled to the central shaft, wherein the centrifugal weights rotate between a disengaged position in which the centrifugal weights do not interface with drive surfaces and an engaged position in which the centrifugal weights interface with the drive surfaces, and wherein the centrifugal weights are disposed inside the perimeter of the disk when the centrifugal weights are in the engaged position.

In accordance with another embodiment, a centrifugal clutch mechanism is provided. The centrifugal clutch mechanism includes a disk having a perimeter; centrifugal weights movably coupled to the disk; a central shaft rotatable relative to the disk and disposed between the centrifugal weights, the central shaft comprising drive surfaces, wherein the disk is configured to be rotated by an input, wherein the central shaft is configured to rotate an output, wherein the centrifugal weights rotate between a disengaged position in which the centrifugal weights do not interface with drive surfaces and an engaged position in which the centrifugal weights interface with the drive surfaces, and wherein each of the centrifugal weights is compressed between an outer surface of the disk and the drive surfaces of the central shaft when the centrifugal weights are in the engaged position.

In accordance with another embodiment, a centrifugal clutch mechanism is provided. The centrifugal clutch mechanism includes a disk having a perimeter; centrifugal weights movably coupled to the disk; a central shaft rotatable relative to the disk and disposed between the centrifugal weights, the central shaft comprising drive surfaces, wherein the disk is configured to be rotated by an input, wherein the central shaft is configured to rotate an output, wherein the centrifugal weights rotate between a disengaged position in which the centrifugal weights do not interface with drive surfaces and an engaged position in which the centrifugal weights interface with the drive surfaces, and wherein the centrifugal weights are disposed inside of a perimeter of the disk when the centrifugal weights are in the engaged position.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, clutch mechanisms and machines using clutch mechanisms described herein operate using centrifugal force to rotate centrifugal weights between a disengaged position and an engaged position. As a disk of the clutch mechanism begins to rotate, the centrifugal weights rotate from the disengaged position to the engaged position. In the engaged position, the centrifugal weights interface with one or more drive surfaces of a central shaft to transmit power from an input to an output, e.g., from an input gear interfaced with the clutch mechanism to an output gear interfaced with the clutch mechanism. In the disengaged position, the centrifugal weights are not interfaced with the drive surfaces and power is not transmitted from the input to the output. The centrifugal weights can start to rotate when the disk, upon which the centrifugal weights are coupled, reaches a threshold rotational speed. At and above the threshold rotational speed, the centripetal force of rotation can cause the centrifugal weights to move. At a threshold rotational speed, the centrifugal weights can interface with the drive surfaces of the central shaft to drive the central shaft. The central shaft is coupled to an output. Accordingly, driven rotation of the central shaft by the centrifugal weights can transmit power from the input to the output.

Figure 1:
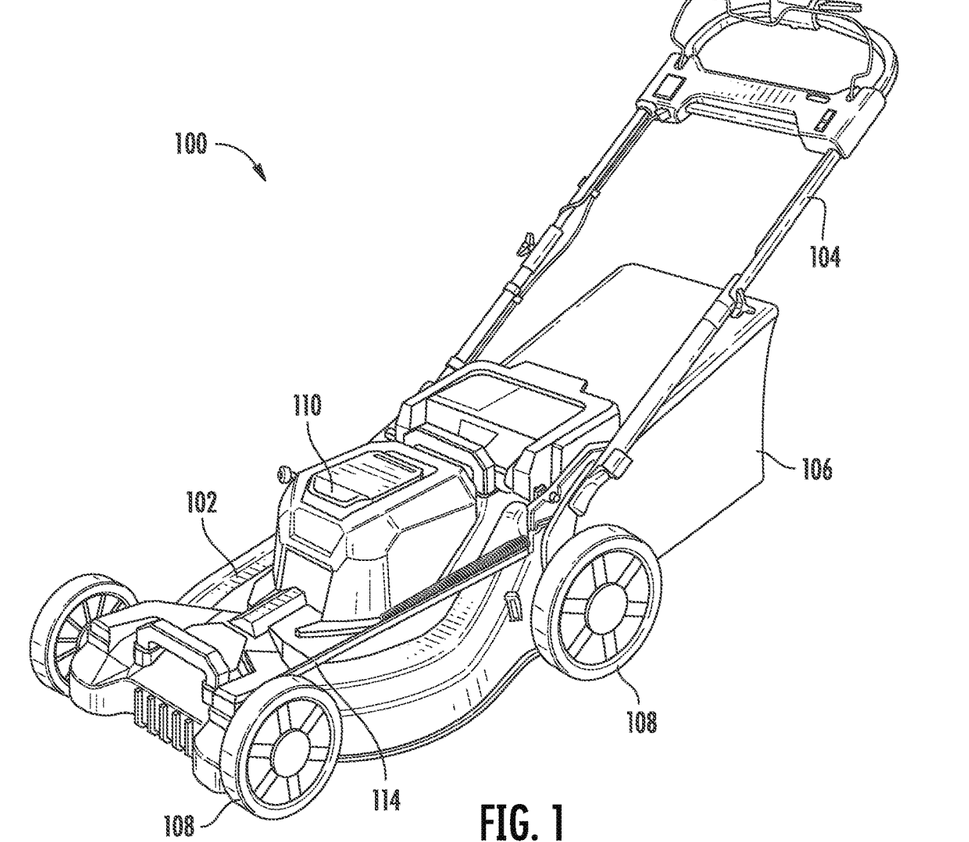
FIG. 1 is a perspective view of a lawnmower in accordance with embodiments of the present disclosure.

Referring now to the drawings, FIG. 1 illustrates a lawnmower 100 in accordance with an exemplary embodiment of the present disclosure. The lawnmower 100 generally includes a body 102, a handle 104 extending from the body 102 to allow an operator to push or control the lawnmower 100, a bagging unit 106 coupled with the body 102 and configured to collect debris and clippings ejected from a mowing area of the body 102 when the lawnmower 100 is in use, and a plurality of walking elements in the form of, e.g., wheels 108. The lawnmower 100 further includes a battery storage area 110 configured to receive one or more batteries (not illustrated) and a prime mover, such as a motor 112 (FIG. 2), which drives the wheels 108. The lawnmower 100 can further include a deck height adjustment assembly 114 which allows the operator to control a height of cut. The deck height adjustment 114 may be adjustable through an interface located at the handle 104. While the lawnmower 100 depicted in FIG. 1 is a walking mower (i.e., an operator walks behind the mower to control the mower), in one or more other embodiments, the lawnmower 100 can include a riding lawnmower or even another type of equipment, such as, e.g., a tractor, a snow thrower, an edger, or the like. While the following description relates to control of a driving aspect of the lawnmower 100, i.e., the described embodiment transmits powers from the motor 112 to the wheels 108, in other embodiments the described system can affect control of a different aspect of the machine, e.g., a selective power transmitter between a motor and a cutting blade, auger, or the like.

Figure 2:
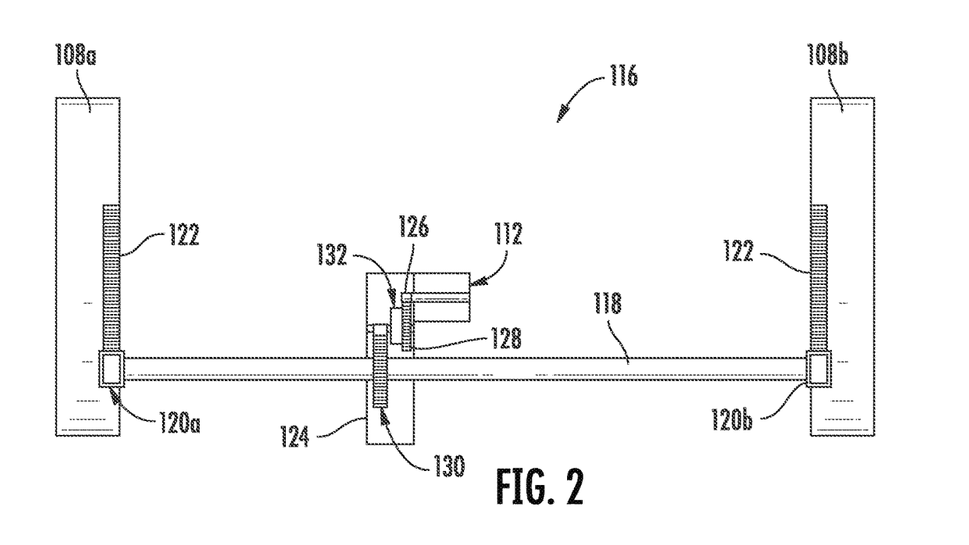
FIG. 2 is a schematic view of a drive system of the lawnmower in accordance with embodiments of the present disclosure.

FIG. 2 illustrates a schematic view of an exemplary drive system 116 of the lawnmower 100 which transmits power from the motor 112 to opposite wheels 108*a* and 108*b*. The wheels 108*a* and 108*b* can be, for example, left and right rear wheels of the lawnmower 100. The wheels 108*a* and 108b can be interfaced with an axle 118 through gears 120a and 120b. The gears 120a and 120b can interface with a wheel gear 122 of each one of the wheels 108a and 108b. Thus, as the axle 118 rotates, the wheels 108a and 108b can be driven by the gears 120a and 120b through the wheel gears 122. In an embodiment, the gears 120a and 120b can be uni-directional gears, e.g., sprag gears, which enable the operator to overrun the lawnmower 100. Overrun is a condition whereby the speed of the lawnmower 100 exceeds a drive speed propelled by the motor 112. For instance, by way of non-limiting example, the motor 112 may be operating at 3 miles per hour. When the operator pushes the lawnmower 100 to increase speed past the operating speed of 3 miles per hour, the gears 120a and 120b can allow the lawnmower 100 to overrun whereby the operator can affect a higher operational speed. The uni-directional gearing may also enable the operator to turn the lawnmower 100 without requiring adjustment of the operating speed or any internal gearing.

The lawnmower 100 can further include a transmission 124 which converts power from an output 126 of the motor 112 to the axle 118. The transmission 124 can include, for instance, an input 128 in communication with the output 126 of the motor 112 and an output 130 in communication with the axle 118. A clutch mechanism 132 can be disposed between the input 128 and the output 130 for selectively transmitting power from the input 128 to the output 130. In some instances, the clutch mechanism 132 can be directly coupled with the output 126 of the motor 112. In such instances, the output 126 from the motor 112 can be referred to as the input.

When the motor 112 is operating at low speeds, i.e., below a low-speed threshold, the clutch mechanism 132 may be disengaged such that power from the motor 112 is not transmitted from the input 128 to the output 130. As the motor 112 increases speed, the clutch mechanism 132 may engage at, or around, the low-speed threshold to transmit power from the input 128 to the output 130. Power from the output 130 can then be transmitted to the wheels 108a and 108b through the axle 118 and gears 120a and 120b, respectively, to drive the wheels 108a and 108b.

Figure 3:
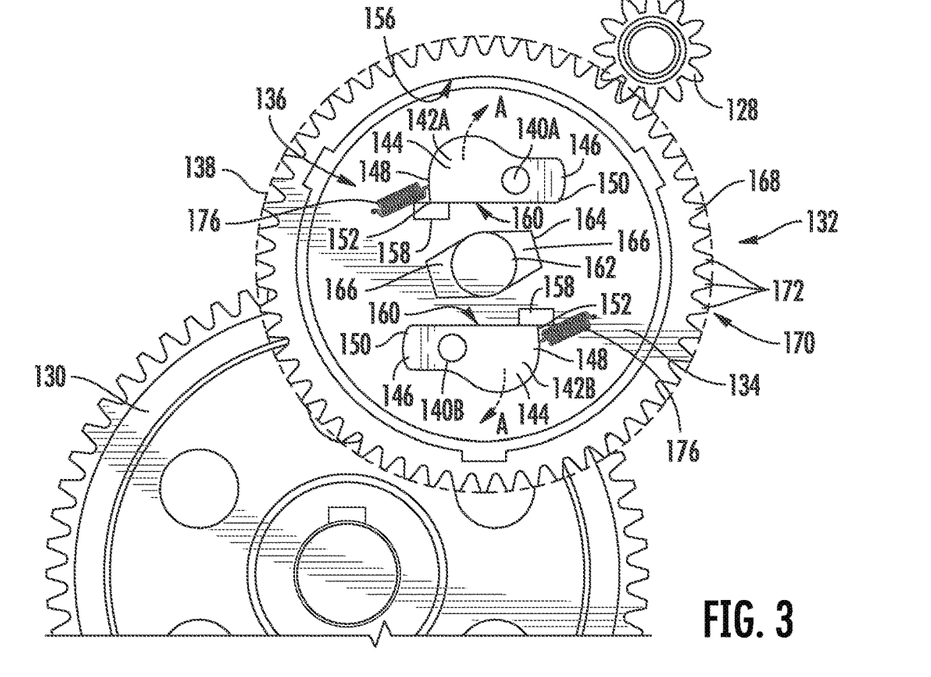
FIG. 3 is a simplified elevation view of a portion of a transmission of the drive system of the lawnmower as viewed in a disengaged position in accordance with embodiments of the present disclosure.
Figure 4:
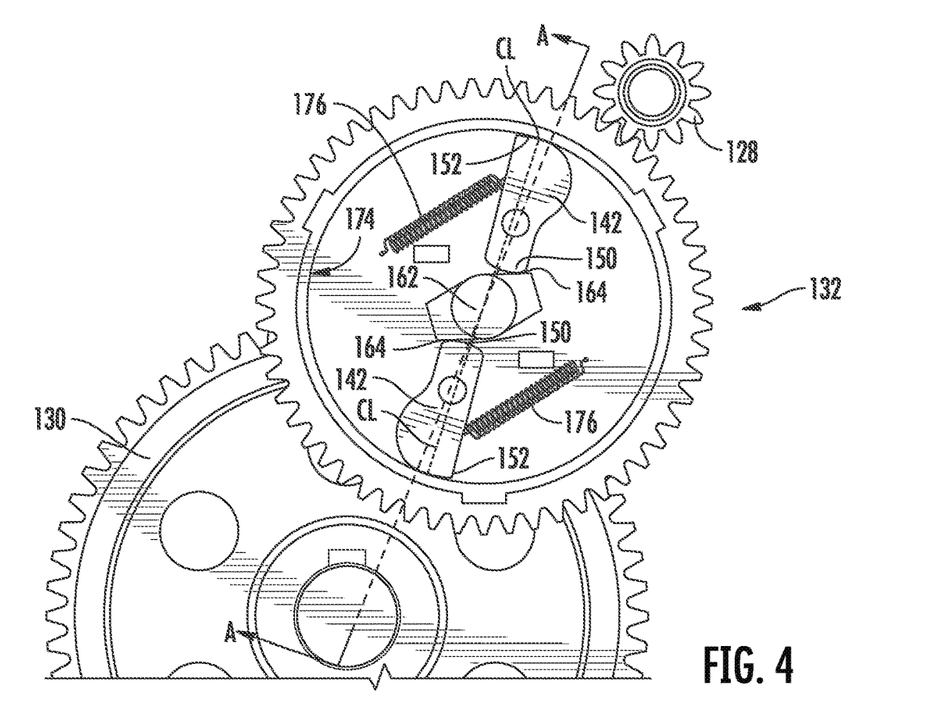
FIG. 4 is a simplified elevation view of a portion of the transmission of the drive system of the lawnmower as viewed in an engaged position in accordance with embodiments of the present disclosure.

FIGS. 3 and 4 illustrate a specific embodiment of the clutch mechanism 132. FIG. 3 illustrates the clutch mechanism 132 in the disengaged position whereby the clutch mechanism 132 does not transmit power from the input 128 to the output 130. FIG. 4 illustrates the clutch mechanism 132 in the engaged position whereby the clutch mechanism 132 transmits power from the input 128 to the output 130.

Referring to FIG. 3, the clutch mechanism 132 generally includes a disk 134 having a major surface 136 and an outer perimeter 138. A first post 140A extends from the disk 134 in a direction generally perpendicular to the major surface 136. Similarly, a second post 140B extends from the disk 134 in a direction generally perpendicular to the major surface 136. The first and second posts 140A and 140B can be disposed at generally opposite sides of a central opening (not illustrated) of the disk 134. For instance, the first and second posts 140A and 140B can be spaced apart by 180°, or approximately 180° around the central opening of the disk 134. Centrifugal weights 142A and 142B can be coupled to the posts 140A and 140B, respectively. The centrifugal weights (collectively referred to by numeral 142) can be rotatable with respect to the posts (collectively referred to by numeral 140). As depicted in FIG. 3, the centrifugal weights 142 are each in the disengaged position. As the disk 134 begins to rotate, the centrifugal weights 142 can rotate about the posts 140 in a direction indicated by arrows A in FIG. 3.

As described in greater detail below, the centrifugal weights 142 can thus move to the engaged position whereby the clutch mechanism 132 can transmit power to the output 130.

In an embodiment, the clutch mechanism 132 can be configured such that the centrifugal weights 142 rotate at least 5° as measured between the disengaged and engaged positions, such as at least 10° as measured between the disengaged and engaged positions, such as at least 15° as measured between the disengaged and engaged positions, such as at least 20° as measured between the disengaged and engaged positions, such as at least 25° as measured between the disengaged and engaged positions, such as at least 30° as measured between the disengaged and engaged positions, such as at least 35° as measured between the disengaged and engaged positions, such as at least 40° as measured between the disengaged and engaged positions. In a more particular embodiment, the clutch mechanism 132 can be configured such that the centrifugal weights 142 rotate at least 10° as measured between the disengaged and engaged positions, such as at least 20° as measured between the disengaged and engaged positions, such as at least 30° as measured between the disengaged and engaged positions, such as at least 45° as measured between the disengaged and engaged positions, such as at least 60° as measured between the disengaged and engaged positions, such as at least 90° as measured between the disengaged and engaged positions, such as at least 95° as measured between the disengaged and engaged positions.

Referring still to FIG. 3, the centrifugal weights 142 can share a common size. More particularly, the centrifugal weights 142 can have a common mass and a common moment of inertia. In this regard, the centrifugal weights 142 can rotate at the same, or approximately same, rotational speed of the disk 134. This can prevent wobble of the disk 134 which might otherwise occur under eccentric loading conditions. In instances with more than two centrifugal weights 142, it may be possible to vary one or more aspects of opposite pairs of centrifugal weights 142, e.g., two centrifugal weights 142 can have a first same shape while another two centrifugal weights 142 disposed between the two centrifugal weights 142 can have a second shape different from the first shape.

The centrifugal weights 142 can each generally include a body 144 defining a first end 146 and a second end 148. The first end 146 can include an engagement 150. By way of example, the engagement 150 can be a dog or other interface configured to interface with a central shaft 154 of the clutch mechanism 132. The second end 148 can include an engagement 152. The engagement 152 can be a dog or other interface configured to interface with an outer surface 156 of the disk 134 as described in greater detail below.

The disk 134 can include stops 158 which support the centrifugal weights 142 when the centrifugal weights 142 are in the disengaged position as illustrated in FIG. 3. In the illustrated embodiment, the stops 158 are blocks extending from the disk 134. In other embodiments, the stops 158 can include, e.g., pins, screws, springs, soft bumpers (e.g., rubber bumpers), or the like. The bodies 144 of each centrifugal weight 142 can include a stop surface 160 which rests against the stop 158. In one or more embodiments, at least one of the stops 158 can include a flat surface against which a flat stop surface 160 of the centrifugal weight 142 can be supported when the centrifugal weights 142 are in the disengaged position.

A central shaft 162 is disposed at a generally central location of the disk 134. In a particular embodiment, the central shaft 162 is coaxial with the disk 134. The central shaft 162 can extend through the central opening (not illustrated) in the disk 134 such that a portion of the central shaft 162 is on a first side of the disk 134 and another portion of the central shaft 162 is on a second, opposite side of the disk 134. The central shaft 162 can be rotatable with respect to the disk 134. In a particular embodiment, the disk 134 may rotate about the central shaft 162. In this regard, the central shaft 162 can form an axle upon which the disk 134 rotates.

The central shaft 162 can include one or more drive surfaces 164. In the illustrated embodiment, the central shaft 162 includes two drive surfaces 164 disposed on protrusions 166 extending from the central shaft 162 in a generally radial direction. In an embodiment, the protrusions 166 can prevent the disk 134 from sliding off the central shaft 162.

As previously described, the input 128 can receive driving power from the prime mover of the lawnmower 100. In the depicted embodiment, the input 128 is an input gear. The input gear can be coupled to a shaft and rotatable about a central axis. The input gear is rotated, e.g., counterclockwise, to rotatably drive the clutch mechanism 132, e.g., clockwise. The input gear can interface with the clutch mechanism 132 at an outer gear 168 of the disk 134. The outer gear 168 can be disposed at, or adjacent, the outer perimeter 138 of the disk 134. In an embodiment, the outer gear 168 can form at least a portion of the outer perimeter 138 of the disk 134. For example, a top land 170 of each tooth 172 of the outer gear 168 can form the outer perimeter 138 of the disk 134.

In some instances, the input 128 and disk 134 of the clutch mechanism 132 can be coplanar. That is, the input 128 and disk 134 can lie along a same plane. In other instances, the input 128 and disk 134 can lie along parallel offset planes. That is, the input 128 and disk 134 can be parallel with one another but lie along different planes. In yet other instances, the input 128 and disk 134 can lie along angularly offset planes. For instance, the input 128 and disk 134 can form a beveled gear interface angularly offset, e.g., by 90°, from one another.

At low operational speeds, e.g., below a low-speed threshold, the clutch mechanism 132 can appear as shown in FIG. 3. As the speed of the clutch mechanism 132 increases as a result of increased rotational speed of the disk 134, the centrifugal weights 142 can rotate about posts 140 as shown by arrow A. In certain instances, the clutch mechanism 132 can rotate in a range of rotational speeds whereby the centrifugal weights 142 are not supported by the stops 158 but the centrifugal weights 142 are also not in the engaged position. This may be referred to as an intermediate period where the centrifugal weights 142 are moving from the disengaged position to the engaged position. As the speed of rotation increases to the low-speed threshold, the centrifugal weights 142 can move to the engaged position as shown in FIG. 4.

FIG. 4 illustrates the clutch mechanism 132 with the centrifugal weights 142 in the engaged position whereby the clutch mechanism 132 can transmit power from the input 128 to the output 130. As depicted, the engagement 150 of each centrifugal weight 142 is in contact with a respective drive surface 164 of the central shaft 162 when the centrifugal weights 142 are in the engaged position. Moreover, the engagements 152 of each centrifugal weight 142 are interfaced with the disk 134, e.g., at an outer surface 174 of the clutch mechanism 132, such that further rotation of the centrifugal weights 142 about the posts 140 is prevented. In this state, each of the centrifugal weights 142 is compressed between the outer surface 174 of the clutch mechanism 132 and the drive surface 164 of the central shaft 162 such that each centrifugal weight 142 acts like a fixed power transmission member for transmitting power from the input 128 to the central shaft 162. Accordingly, the output 130 is rotatably driven by the clutch mechanism 132 in the engaged position as illustrated in FIG. 4.

The outer surface 174 of the clutch mechanism 132 is intended to refer to a surface of the clutch mechanism 132 disposed radially outside of the centrifugal weights 142 that maintains the centrifugal weights 142 in the engaged position. As the centrifugal weights 142 move to the outer surface 174, the engagement 150 can interface with the drive surface 164 of the central shaft 162. Without the outer surface 174, it is possible that the centrifugal weights 142 would continue to rotate about the posts 140 as caused, e.g., by resistance and inertia of the central shaft 162. That is, the outer surface 174 prevents over-rotation of the centrifugal weights 142.

In the illustrated embodiment, the outer surface 174 comprises a surface extending from the disk 134 in a direction perpendicular, or generally perpendicular, to the major surface 136 of the disk 134. The surface can extend continuously around the disk 134 or include, e.g., a plurality of surfaces against which the centrifugal weights 142 can interface. In one or more non-illustrated embodiments, the outer surface 174 can include a post, a screw, a spring, a bumper (e.g., a rubber bumper), or the like. In some instances, the outer surface 174 can have a same, or similar, construction as the stop 158, e.g., the outer surface 174 and stop 158 can be integral with the disk 134. In other instances, the outer surface 174 and stop 158 can have different constructions, e.g., the stop 158 can include a discrete (separate) component coupled with the disk 134 and the outer surface 174 can be integral with the disk 134.

In an embodiment, the centrifugal weights 142 can be disposed inside of the perimeter 138 (FIG. 3) when the centrifugal weights 142 are in the disengaged and engaged positions. That is, the centrifugal weights 142 may remain within the perimeter 138 of the disk 134 at all times during operation. In a more particular embodiment, all elements of the clutch mechanism 132 can remain within the outer perimeter 138 of the disk 134 at all times during operation. In this regard, the clutch mechanism 132 can be utilized in transmissions 124 without consideration for moving parts (e.g., the centrifugal weights 142) which might form a new outermost perimeter of the clutch mechanism 132 at certain operational speeds. That is, by maintaining all components of the clutch mechanism 132 within the same outer perimeter 138 at all times during operation, the clutch mechanism 132 can be treated more similarly to any other operating gears or elements of the transmission 124 without requiring special accommodation.

In an embodiment, the centrifugal weights 142 can each define a centerline CL. The centerlines CL of the centrifugal weights 142 can be angularly offset from one another by less than 45°, as measured when the centrifugal weights are in the engaged position, such as less than 30°, as measured when the centrifugal weights are in the engaged position, such as less than 15°, as measured when the centrifugal weights are in the engaged position. In the depicted embodiment, the centerlines CL of the centrifugal weights 142 are angularly offset from one another by less than 5°.

Figure 5:
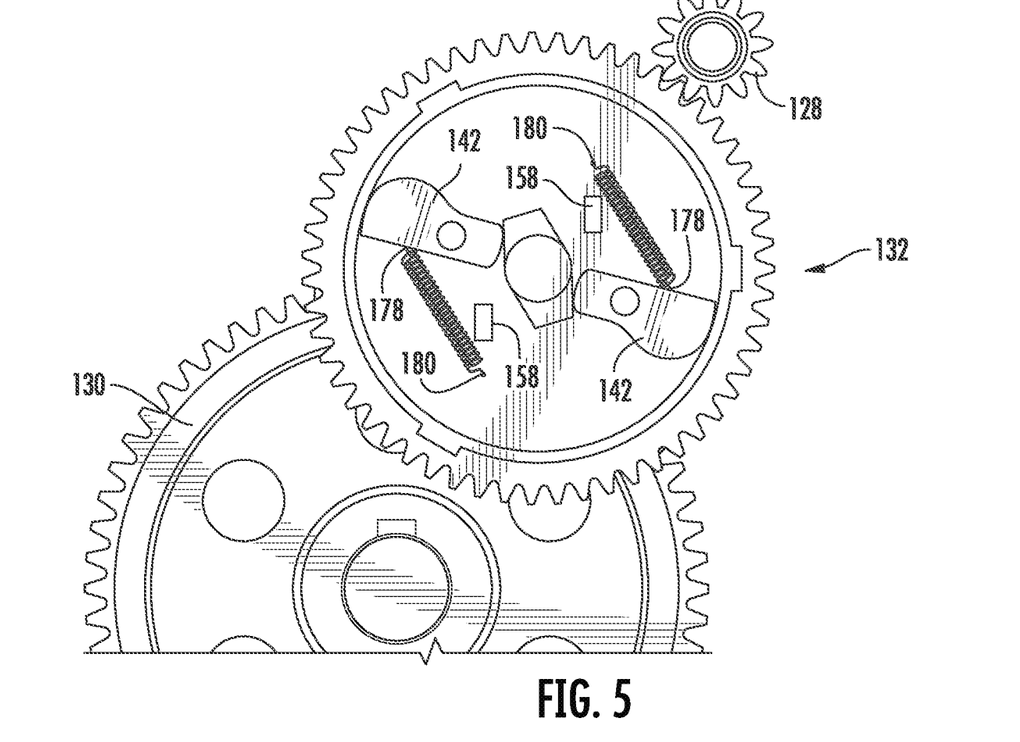
FIG. 5 is a simplified elevation view of a portion of the transmission of the drive system of the lawnmower as viewed in the engaged position in accordance with embodiments of the present disclosure.

FIG. 5 illustrates a view of the clutch mechanism 132 with the centrifugal weights 142 in the engaged position similar to FIG. 4, however, FIG. 5 depicts the clutch mechanism 132 after 90° of rotation, caused by rotation of the input 128. The centrifugal weights 142 can remain in the position illustrated in FIGS. 4 and 5 as the clutch mechanism 132 rotates, and more particularly as the clutch mechanism 132 rotates above the low-speed threshold. As the clutch mechanism 132 decreases speed below the low-speed threshold, the centrifugal weights 142 can move towards the stops 158. Under a certain rotational speed, the centrifugal weights 142 can return to rest against the stops 158 as depicted in FIG. 3.

To return the centrifugal weights 142 to the disengaged position, the clutch mechanism can include one or more urging elements, e.g., springs 176, which provide a force to the centrifugal weights 142 to return them to the disengaged position. In the depicted embodiment, the springs 176 have first ends 178 coupled to the centrifugal weights 142 and second ends 180 coupled to the disk 134. In other instances, the springs 176 may be connected between the centrifugal weights 142 and another portion of the clutch mechanism 132, such as the stops 158 or a separate spring attachment point. The springs 176 can be, e.g., coil springs which are selected to have a spring constant and size to affect disengagement of the centrifugal weights 142 at a desired low-speed threshold. For instance, springs 176 with lower spring constants may remain engaged at lower low-speed thresholds while springs 176 with higher spring constants may disengage at lower low-speed thresholds.

Figure 6:
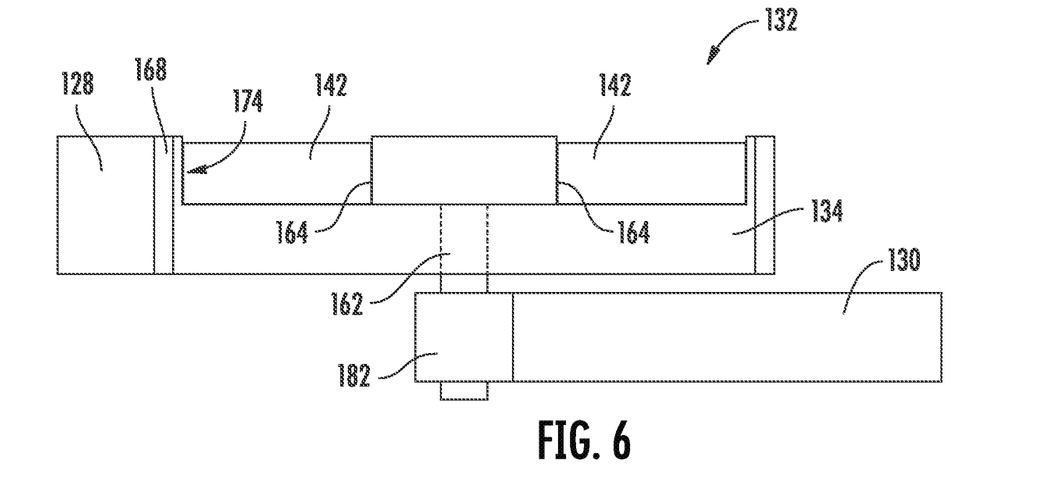
FIG. 6 is a cross-sectional view of a portion of the transmission as seen along Line A-A in FIG. 4 in accordance with embodiments of the present disclosure.

FIG. 6 illustrates a simplified cross-sectional view of the transmission 124 as seen along Line A-A in FIG. 4. As depicted in FIG. 6, the input 128 transmits power to the clutch mechanism 132 through the outer gear 168. The disk 134 of the clutch mechanism 132 then transmits the power to the centrifugal weights 142 (depicted in the engaged position with outer surface 174). The centrifugal weights 142 then transmit the power to the central shaft 162 (through the interface between the engagement 150 and drive surfaces 164). The central shaft 162 then transmits the power to the output 130 through a meshing interface, e.g., a gear 182. As depicted, the output 130 can be in a different plane than at least one of the input 128 and the clutch mechanism 132.

Figure 7:
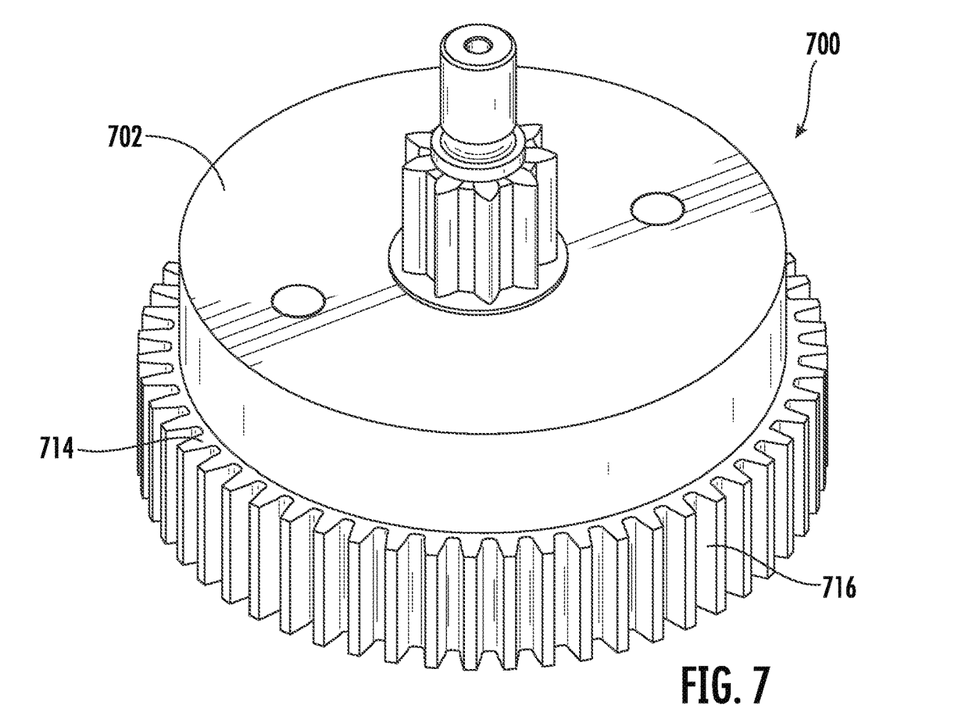
FIG. 7 is a perspective view of a transmission in accordance with embodiments of the present disclosure.
Figure 8:
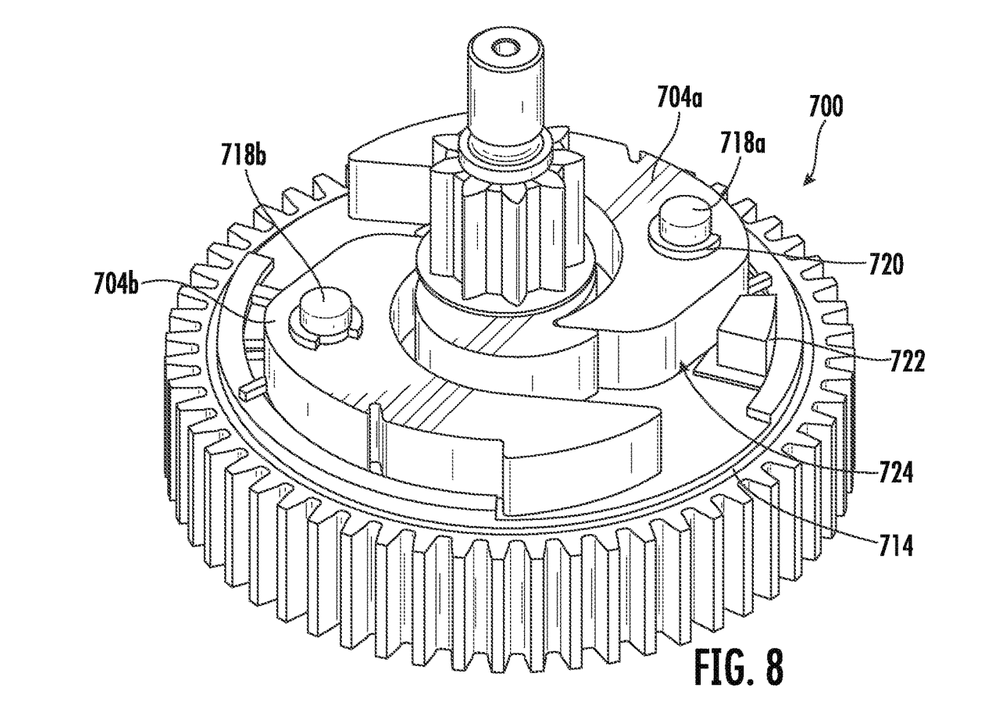
FIG. 8 is a perspective view of the transmission with a cover of the transmission removed in accordance with embodiments of the present disclosure.
Figure 9:
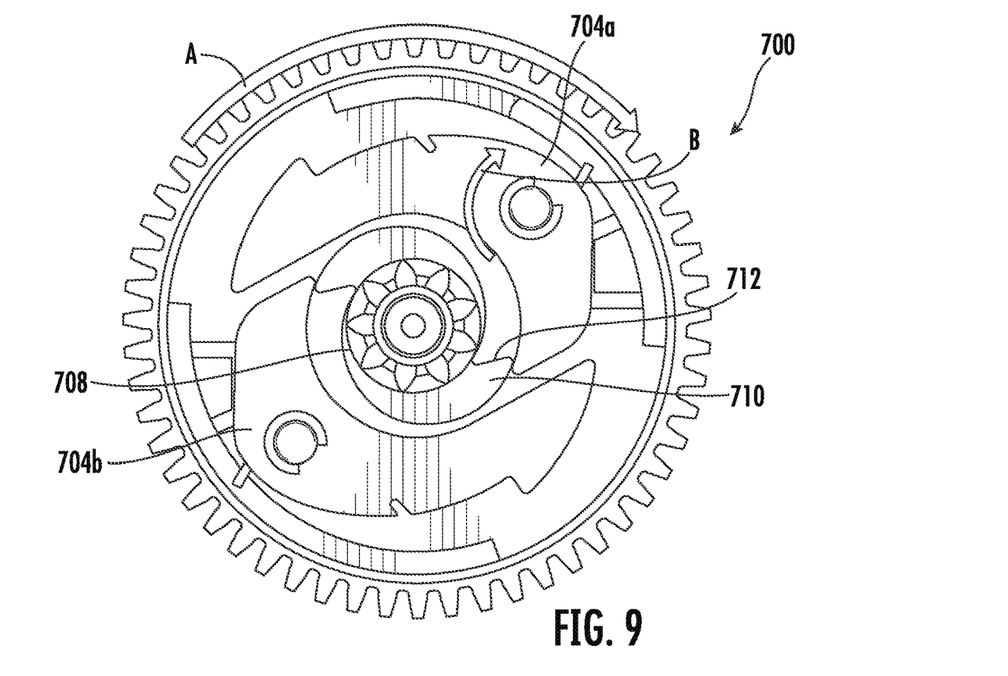
FIG. 9 is a front view of the transmission as seen in the disengaged position with the cover removed in accordance with embodiments of the present disclosure.
Figure 10:
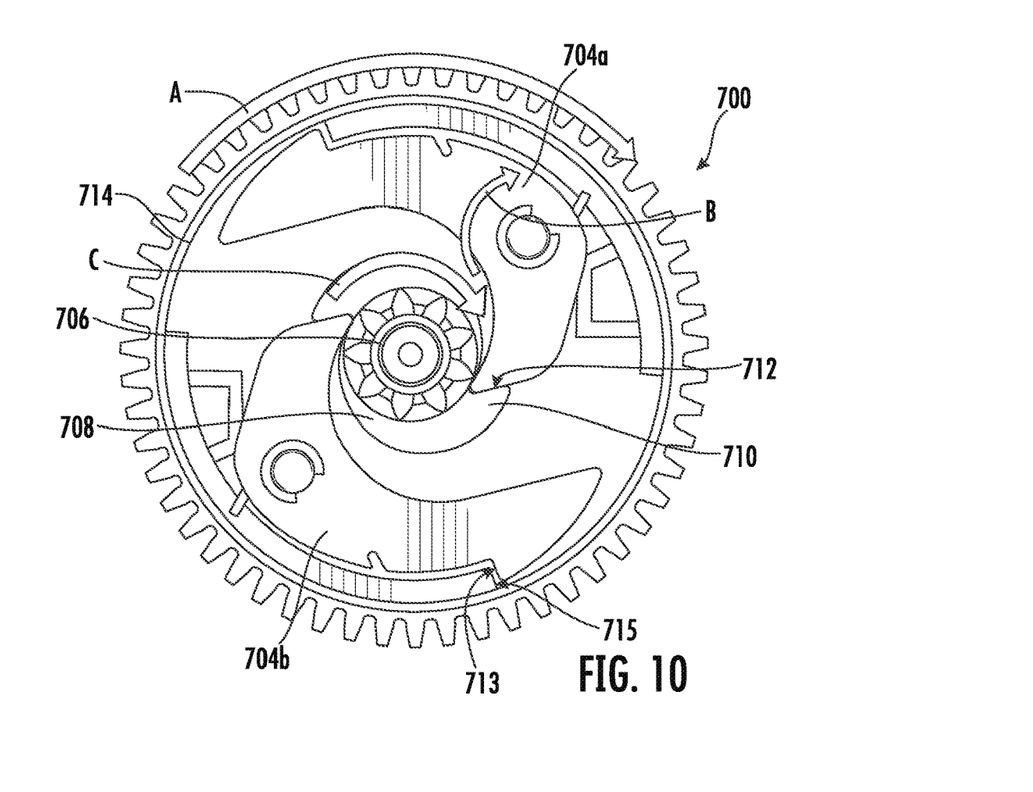
FIG. 10 is a front view of the transmission as seen in the engaged position with the cover removed in accordance with embodiments of the present disclosure.
Figure 11:
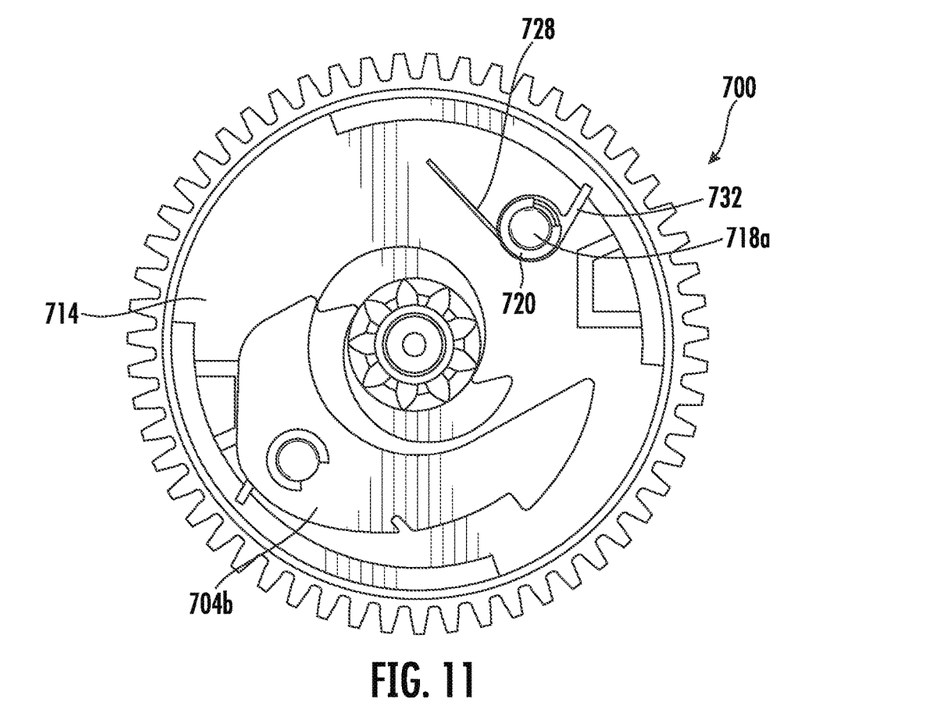
FIG. 11 is a front view of the transmission with one of the centrifugal weights removed in accordance with embodiments of the present disclosure.
Figure 12:
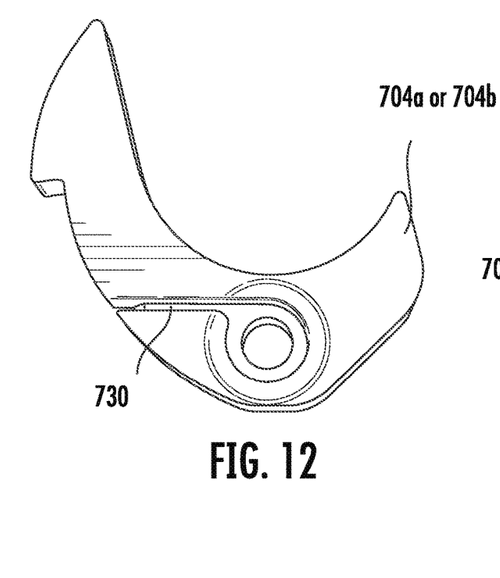
FIG. 12 is a rear view of the centrifugal weight removed in FIG. 10 in accordance with embodiments of the present disclosure.
Figure 13:
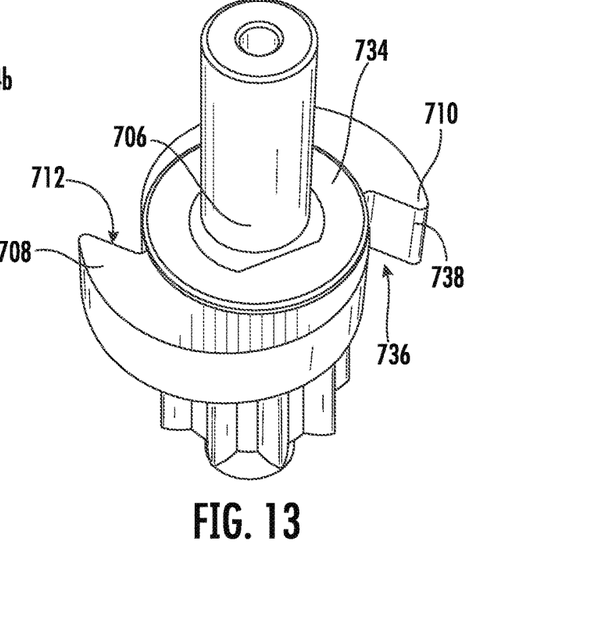
FIG. 13 is a perspective view of a central shaft and an engagement mechanism including protrusions with drive surfaces.

FIGS. 7 to 13 depict a transmission 700 in accordance with another embodiment of the present disclosure. In particular, FIG. 7 depicts a perspective view of the transmission 700. FIG. 8 depicts a perspective view of the transmission 700 with a cover 702 of the transmission removed. FIG. 9 depicts a front view of the transmission 700 as seen in the disengaged position with the cover 702 removed. FIG. 10 depicts a front view of the transmission 700 as seen in the engaged position with the cover 702 removed. FIG. 11 depicts a front view of the transmission 700 with one of the centrifugal weights 704 removed. FIG. 12 depicts a rear view of the centrifugal weight 704a removed in FIG. 10. FIG. 13 depicts a perspective view of a central shaft 706 and an engagement mechanism 708 including protrusions 710 with drive surfaces 712.

Referring initially to FIG. 7, the transmission 700 includes a disk 714 having a geared edge 716. The transmission 700 defines a volume housing components of the transmission 700 between the disk 714 and the cover 702.

As seen in FIG. 8, the volume defined by the disk 714 and cover 702 can house centrifugal weights 704a and 704b. Similar to the centrifugal weights 142a and 142b, the centrifugal weights 704a and 704b can move between engaged and disengaged positions. The centrifugal weights 704a and 704b are movably coupled, e.g., rotatably coupled, to the disk 714 through first and second posts 718a and 718b, respectively. Retaining rings 720 can retain the centrifugal weights 704 and 704b on the first and second posts 718a and 718b. The retaining rings 720 can sit within grooves located in the first and second posts 718a and 718b and prevent the first and second centrifugal weights 704a and 704b from sliding off the first and second posts 718a and 718b.

Stops 722 can be disposed on the disk 714 to limit rotational movement of the first and second centrifugal weights 704a and 704b relative to the first and second posts 718a and 718b, respectively. The stops 722 can have any one or more similar characteristics as compared to stops 158. For example, the stops 722 can support the centrifugal weights 704a and 704b when the centrifugal weights 704a and 704b are in the disengaged position as illustrated in FIG. 8. In the illustrated embodiment, the stops 722 are blocks extending from the disk 714. In other embodiments, the stops 722 can include, e.g., pins, screws, springs, soft bumpers (e.g., rubber bumpers), or the like. Each of the centrifugal weights 704a and 704b can include a stop surface 724 which rests against the stop 722. In one or more embodiments, at least one of the stops 722 can include a flat surface against which a flat stop surface 724 of a respective one of the centrifugal weights 704a and 704b can be supported when the centrifugal weights 704a or 704b are in the disengaged position.

FIG. 9 depicts a front view of the transmission 700 in the disengaged state, i.,e., the centrifugal weights 704a and 704b are disengaged from the drive surfaces 712 of protrusions 710 of the engagement mechanism 708. As the transmission 700 starts spinning in the direction A, the centrifugal weights 704a and 704b can rotate in direction B. Referring to FIG. 10, at a critical rotational speed of the disk 714 in the direction A, the centrifugal weights 704a and 704b can engage with the drive surfaces 712 of the protrusions 710 of the engagement mechanism 708. At a relatively same time, drive surfaces 713 of the centrifugal weights 704a and 704b can engage with surfaces 715 of the disk 714 to prevent further rotation of the centrifugal weights 704a and 704b and drive the disk 714. At such time, the disk 714 can drive the engagement mechanism 708 in the direction C. Thus, input power can be transmitted through the transmission 700 when the centrifugal weights 704a and 704b are in the engaged positions, as depicted in FIG. 10. Meanwhile, the engagement mechanism 708 can transmit power to the central shaft 706 to drive the aforementioned wheels.

FIG. 11 depicts a view of the transmission 700 with one of the centrifugal weights 704a removed. As depicted, the centrifugal weight 704a can be engaged with the disk 714 through a spring 728. The spring 728 can be disposed within a cutout 730 (FIG. 12) of the centrifugal weight 704a. The spring 724 can be, e.g., a torsion spring, and can bias the centrifugal weight 704a to the disengaged position. In an embodiment, the disk 714 can include a receiving area, e.g., a groove 732, in which a portion of the spring 728, e.g., a finger of the torsion spring 728, can fit. When the retaining clip 720 is in place within a groove of the first post 718a, the spring 728 can be fit within the groove 732 and prevented from escaping. Thus, the spring 728 can remain fixed relative to the disk 714.

FIG. 13 depicts a view of the engagement mechanism 708 coupled with the central shaft 706. In accordance with an embodiment, the engagement mechanism 708 can include a central hub 734 from which the protrusions 708 extend. The protrusions 708 can form pockets 736 in which the centrifugal weights 704a and 704b (FIG. 12). In an embodiment, the pockets 736 can have acute angles as viewed along an axis of the central shaft 706. In certain instances, the pockets 736 (e.g., the drive surfaces 712) can be shaped to have a close fit with the centrifugal weights 704a and 704b. Tips 738 of the protrusions 708 may be rounded to facilitate entrance of the centrifugal weights 704a and 704b into the pockets 736.

As rotational speed of the transmission 700 is reduced from operating speeds, the centrifugal weights 704a and 704b can rotate back to the disengaged position depicted in FIG. 9 in the direction opposite direction B. This rotation to the disengaged position can be facilitated, at least in part, by the spring 728.

Further aspects of the invention are provided by one or more of the following embodiments:

Embodiment 1. A transmission comprising: an input; an output; a centrifugal clutch mechanism that transfers energy from the input to the output, the centrifugal clutch mechanism comprising: a disk; centrifugal weights movably coupled to the disk; and a central shaft rotatable relative to the disk and extending through the disk, the central shaft comprising drive surfaces, wherein the disk is rotatably coupled to the input, wherein the output is rotatably coupled to the central shaft, wherein the centrifugal weights rotate between a disengaged position in which the centrifugal weights do not interface with drive surfaces and an engaged position in which the centrifugal weights interface with the drive surfaces, and wherein the centrifugal weights are disposed inside the perimeter of the disk when the centrifugal weights are in the engaged position.

Embodiment 2. The transmission of any one or more of the embodiments, wherein the input comprises an input gear that meshes with an outer gear of the disk.

Embodiment 3. The transmission of any one or more of the embodiments, wherein the outer gear extends around the perimeter of the disk.

Embodiment 4. The transmission of any one or more of the embodiments, wherein each of the centrifugal weights is compressed between an outer surface of the disk and the drive surfaces of the central shaft when the centrifugal weights are in the engaged position.

Embodiment 5. The transmission of any one or more of the embodiments, wherein the centrifugal clutch mechanism further comprises posts rotatably supporting the centrifugal weights, wherein the posts extend from the disk, and wherein the centrifugal clutch mechanism comprises stops configured to support the centrifugal weights when the centrifugal weights are in the disengaged position.

Embodiment 6. The transmission of any one or more of the embodiments, wherein each of the centrifugal weights is urged towards the disengaged position by a spring, and wherein the spring has a first end coupled to one of the centrifugal weights and a second end coupled to the disk.

Embodiment 7. The transmission of any one or more of the embodiments, wherein the centrifugal weights each comprise a centerline, and wherein the centerlines of centrifugal weights disposed on opposite sides of the central shaft are angularly offset from one another by less than 45°, as measured when the centrifugal weights are in the engaged position.

Embodiment 8. The transmission of any one or more of the embodiments, wherein the input and disk are disposed in a generally same plane as one another, and wherein the output is disposed in a different plane than the input and disk.

Embodiment 9. The transmission of any one or more of the embodiments, wherein the output comprises an output gear that meshes with the central shaft through a geared interface of the central shaft.

Embodiment 10. The transmission of any one or more of the embodiments, wherein the clutch is for a lawnmower.

Embodiment 11. A clutch mechanism comprising: a disk having a perimeter; centrifugal weights movably coupled to the disk; a central shaft rotatable relative to the disk and disposed between the centrifugal weights, the central shaft comprising drive surfaces, wherein the disk is configured to be rotated by an input, wherein the central shaft is configured to rotate an output, wherein the centrifugal weights rotate between a disengaged position in which the centrifugal weights do not interface with drive surfaces and an engaged position in which the centrifugal weights interface with the drive surfaces, and wherein each of the centrifugal weights is compressed between an outer surface of the disk and the drive surfaces of the central shaft when the centrifugal weights are in the engaged position.

Embodiment 12. The clutch mechanism of any one or more of the embodiments, wherein the centrifugal weights are configured to rotate by an angle in a range of 10° and 25° between the disengaged and engaged positions.

Embodiment 13. The clutch mechanism of any one or more of the embodiments, wherein the disk comprises a circular disk with an outer gear disposed at a perimeter of the circular disk, the outer gear being configured to interface with an input gear, wherein the central shaft comprises a geared interface configured to interface with an output gear, and wherein the input gear rotates the output gear when the centrifugal weights are in the engaged position.

Embodiment 14. The clutch mechanism of any one or more of the embodiments, wherein the disk comprises an outer gear, and wherein the outer gear is disposed in a same plane as the centrifugal weights.

Embodiment 15. The clutch mechanism of any one or more of the embodiments, wherein the centrifugal weights contact an outer surface of the disk when the centrifugal weights are in the engaged position.

Embodiment 16. A clutch mechanism comprising: a disk having a perimeter; centrifugal weights movably coupled to the disk; a central shaft rotatable relative to the disk and disposed between the centrifugal weights, the central shaft comprising drive surfaces, wherein the disk is configured to be rotated by an input, wherein the central shaft is configured to rotate an output, wherein the centrifugal weights rotate between a disengaged position in which the centrifugal weights do not interface with drive surfaces and an engaged position in which the centrifugal weights interface with the drive surfaces, and wherein the centrifugal weights are disposed inside of a perimeter of the disk when the centrifugal weights are in the engaged position.

Embodiment 17. The clutch mechanism of any one or more of the embodiments, wherein the angle of rotation of the centrifugal weights, as measured between the disengaged position and the engaged position, is no greater than 20°.

Embodiment 18. The clutch mechanism of any one or more of the embodiments, wherein the centrifugal clutch mechanism further comprises posts rotatably supporting the centrifugal weights, wherein the posts extend from the disk, and wherein the centrifugal clutch mechanism comprises stops configured to support the centrifugal weights when the centrifugal weights are in the disengaged position.

Embodiment 19. The clutch mechanism of any one or more of the embodiments, wherein each of the centrifugal weights is compressed between an outer surface of the disk and the drive surfaces of the central shaft when the centrifugal weights are in the engaged position.

Embodiment 20. The clutch mechanism of any one or more of the embodiments, wherein the input and disk are disposed in a generally same plane as one another, and wherein the output is disposed in a different plane than the input and disk.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A transmission comprising:
   an input comprising an input gear;
   an output;
   a centrifugal clutch mechanism that transfers energy from the input to the output, the centrifugal clutch mechanism comprising:
      a disk having an outer gear that meshes with the input gear;
      centrifugal weights movably coupled to the disk; and
      a central shaft rotatable relative to the disk and extending through the disk, the central shaft comprising drive surfaces,
      wherein the disk is rotatably coupled to the input,
      wherein the output is rotatably coupled to the central shaft,
      wherein the centrifugal weights rotate between a disengaged position in which the centrifugal weights do not interface with drive surfaces and an engaged position in which the centrifugal weights interface with the drive surfaces, and
   wherein the centrifugal weights are disposed inside of a perimeter of the disk when the centrifugal weights are in the engaged position.

2. The transmission of claim 1, wherein the outer gear extends around the perimeter of the disk.

3. The transmission of claim 1, wherein each of the centrifugal weights is compressed between an outer surface of the disk and the drive surfaces of the central shaft when the centrifugal weights are in the engaged position.

4. The transmission of claim 1, wherein the centrifugal clutch mechanism further comprises posts rotatably supporting the centrifugal weights, wherein the posts extend from the disk, and wherein the centrifugal clutch mechanism comprises stops configured to support the centrifugal weights when the centrifugal weights are in the disengaged position.

5. The transmission of claim 1, wherein each of the centrifugal weights is urged towards the disengaged position by a spring, and wherein the spring has a first end coupled to one of the centrifugal weights and a second end coupled to the disk.

6. The transmission of claim 1, wherein the centrifugal weights each comprise a centerline, and wherein the centerlines of the centrifugal weights disposed on opposite sides of the central shaft are angularly offset from one another by less than 45°, as measured when the centrifugal weights are in the engaged position.

7. The transmission of claim 1, wherein the input and disk are disposed in a generally same plane as one another, and wherein the output is disposed in a different plane than the input and disk.

8. The transmission of claim 1, wherein the output comprises an output gear that meshes with the central shaft through a geared interface of the central shaft.

9. The transmission of claim 1, wherein the clutch is for a lawnmower.

10. A clutch mechanism comprising:
    a disk having a perimeter;
    centrifugal weights movably coupled to the disk; and
    a central shaft rotatable relative to the disk and disposed between the centrifugal weights, the central shaft comprising drive surfaces,
    wherein the disk is configured to be rotated by an input,
    wherein the central shaft is configured to rotate an output,
    wherein the centrifugal weights rotate by an angle in a range of 10° and 25° between a disengaged position in which the centrifugal weights do not interface with drive surfaces and an engaged position in which the centrifugal weights interface with the drive surfaces, and
    wherein each of the centrifugal weights is compressed between an outer surface of the disk and the drive surfaces of the central shaft when the centrifugal weights are in the engaged position.

11. The clutch mechanism of claim 10, wherein the disk comprises a circular disk with an outer gear disposed at a perimeter of the circular disk, the outer gear being configured to interface with an input gear, wherein the central shaft comprises a geared interface configured to interface with an output gear, and wherein the input gear rotates the output gear when the centrifugal weights are in the engaged position.

12. The clutch mechanism of claim 10, wherein the disk comprises an outer gear, and wherein the outer gear is disposed in a same plane as the centrifugal weights.

13. The clutch mechanism of claim 10, wherein the centrifugal weights contact an outer surface of the disk when the centrifugal weights are in the engaged position.

14. The clutch mechanism of claim 10, wherein the clutch mechanism is for a lawnmower.

15. A clutch mechanism comprising:
    a disk having a perimeter;
    centrifugal weights movably coupled to the disk; and
    a central shaft rotatable relative to the disk and disposed between the centrifugal weights, the central shaft comprising drive surfaces,
    wherein the disk is configured to be rotated by an input,
    wherein the central shaft is configured to rotate an output,
    wherein the centrifugal weights rotate between a disengaged position in which the centrifugal weights do not interface with drive surfaces and an engaged position in which the centrifugal weights interface with the drive surfaces,
    wherein the centrifugal weights are disposed inside of a perimeter of the disk when the centrifugal weights are in the engaged position,
    wherein the input and disk are disposed in a generally same plane as one another, and
    wherein the output is disposed in a different plane than the input and disk.

16. The clutch mechanism of claim 15, wherein the angle of rotation of the centrifugal weights, as measured between the disengaged position and the engaged position, is no greater than 20°.

17. The clutch mechanism of claim 15, wherein the centrifugal clutch mechanism further comprises posts rotatably supporting the centrifugal weights, wherein the posts extend from the disk, and wherein the centrifugal clutch mechanism comprises stops configured to support the centrifugal weights when the centrifugal weights are in the disengaged position.

18. The clutch mechanism of claim 15, wherein each of the centrifugal weights is compressed between an outer surface of the disk and the drive surfaces of the central shaft when the centrifugal weights are in the engaged position.

19. The clutch mechanism of claim 15, wherein the clutch mechanism is for a lawnmower.

* * * * *